(12) United States Patent
Nolley

(10) Patent No.: US 7,791,234 B2
(45) Date of Patent: Sep. 7, 2010

(54) MOTOR END FRAME ASSEMBLY AND MOTOR INCORPORATING THE SAME

(75) Inventor: Alice Nolley, Dayton, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 348 days.

(21) Appl. No.: 12/020,104

(22) Filed: Jan. 25, 2008

(65) Prior Publication Data

US 2008/0179979 A1    Jul. 31, 2008

Related U.S. Application Data

(60) Provisional application No. 60/897,663, filed on Jan. 26, 2007.

(51) Int. Cl.
 *H02K 5/00*   (2006.01)
 *H02K 17/00*  (2006.01)
(52) U.S. Cl. .................................. 310/89; 310/91
(58) Field of Classification Search ............. 310/46, 310/64, 89, 90, 91, 400, 401, 402, 403, 406, 310/410, 413, 415, 417
See application file for complete search history.

(56) References Cited

U.S. PATENT DOCUMENTS

| | | | |
|---|---|---|---|
| 4,337,405 A * | 6/1982 | Hishida | 310/43 |
| 5,004,942 A | 4/1991 | King | |
| 5,006,743 A | 4/1991 | King et al. | |
| 5,068,556 A | 11/1991 | Lykes et al. | |
| 5,079,464 A | 1/1992 | King et al. | |
| 5,220,226 A | 6/1993 | Long et al. | |
| 5,245,237 A * | 9/1993 | Fisher et al. | 310/89 |
| 5,531,577 A | 7/1996 | Hayase et al. | |
| 5,660,539 A | 8/1997 | Matsunaga et al. | |
| 5,932,942 A | 8/1999 | Patyk et al. | |
| 5,939,807 A | 8/1999 | Patyk et al. | |
| 6,264,446 B1 | 7/2001 | Rajendran et al. | |
| 6,280,154 B1 | 8/2001 | Clendenin et al. | |
| 6,661,140 B2 | 12/2003 | Agnes et al. | |
| 6,831,382 B1 | 12/2004 | Lyle et al. | |
| 6,873,072 B2 | 3/2005 | Ganter et al. | |
| 7,063,518 B2 | 6/2006 | Skinner et al. | |
| 7,180,215 B2 | 2/2007 | Archer et al. | |
| 7,345,391 B2 * | 3/2008 | Bradfield et al. | 310/89 |
| 2002/0109426 A1 * | 8/2002 | Peter et al. | 310/89 |
| 2003/0164653 A1 | 9/2003 | Yasuda | |

(Continued)

FOREIGN PATENT DOCUMENTS

DE    10313273 A1 * 10/2004

(Continued)

*Primary Examiner*—Tran N Nguyen
(74) *Attorney, Agent, or Firm*—Michael Best & Friedrich LLP

(57) ABSTRACT

An electric motor includes a stator, a rotor positioned adjacent the stator and cooperating with the stator to generate a torque, and a bearing support assembly coupled to the rotor to at least partially support the rotor for rotation. An end frame includes a post positioned to engage and support the bearing support assembly. The end frame and the bearing support assembly cooperate to define a space therebetween. A mainframe is coupled to and cooperates with the end frame to substantially enclose the stator, and a set of electronics for controlling the motor is mounted in the space.

19 Claims, 15 Drawing Sheets

U.S. PATENT DOCUMENTS

2006/0267428 A1 11/2006 Archer et al.
2006/0267429 A1 11/2006 Archer et al.
2006/0267430 A1 11/2006 Archer et al.
2006/0267431 A1 11/2006 Johnson et al.
2006/0267432 A1 11/2006 Archer et al.

FOREIGN PATENT DOCUMENTS

JP 58215945 A * 12/1983

* cited by examiner

MOTOR END FRAME ASSEMBLY AND MOTOR INCORPORATING THE SAME

RELATED APPLICATIONS

This patent application claims the benefit of U.S. provisional patent application No. 60/897,663 filed on Jan. 26, 2007, which is fully incorporated herein by reference.

BACKGROUND

The present invention relates to the structure of electric motors and mounting frames for electric motors.

SUMMARY

In one embodiment, the invention provides an electric motor that includes a stator, a rotor positioned adjacent the stator and cooperating with the stator to generate a torque, and a bearing support assembly coupled to the rotor to at least partially support the rotor for rotation. An end frame includes a post positioned to engage and support the bearing support assembly. The end frame and the bearing support assembly cooperate to define a space therebetween. A mainframe is coupled to and cooperates with the end frame to substantially enclose the stator, and a set of electronics for controlling the motor is mounted in the space.

In another embodiment, the invention provides an electric motor that includes a stator, a rotor assembly with a rotor and a bearing mounted onto a shaft for rotation with respect to the stator, and a bearing support assembly operable to receive the bearing. An end frame is coupled to the bearing support assembly to define a space therebetween and a set of electronics for controlling the motor is mounted substantially within the space. A heat sink is coupled to the end frame such that a first surface is exposed to the atmosphere outside of the space and a second surface is in thermal contact with the set of electronics.

In another embodiment, the invention provides a bearing support assembly for an electric motor having a rotor assembly with a rotor and a bearing mounted onto a shaft for rotation with respect to a stator, and an end frame with a post. The bearing support assembly includes a central portion operable to receive the bearing, and an arm radially extending from the central portion. The arm includes a rib extending along at least a portion of the arm, and a receiving aperture adjacent to one end of the arm opposite to the central portion. The receiving aperture of the arm configured to receive the post to press-fit the bearing support assembly to the end frame.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Figure 1:
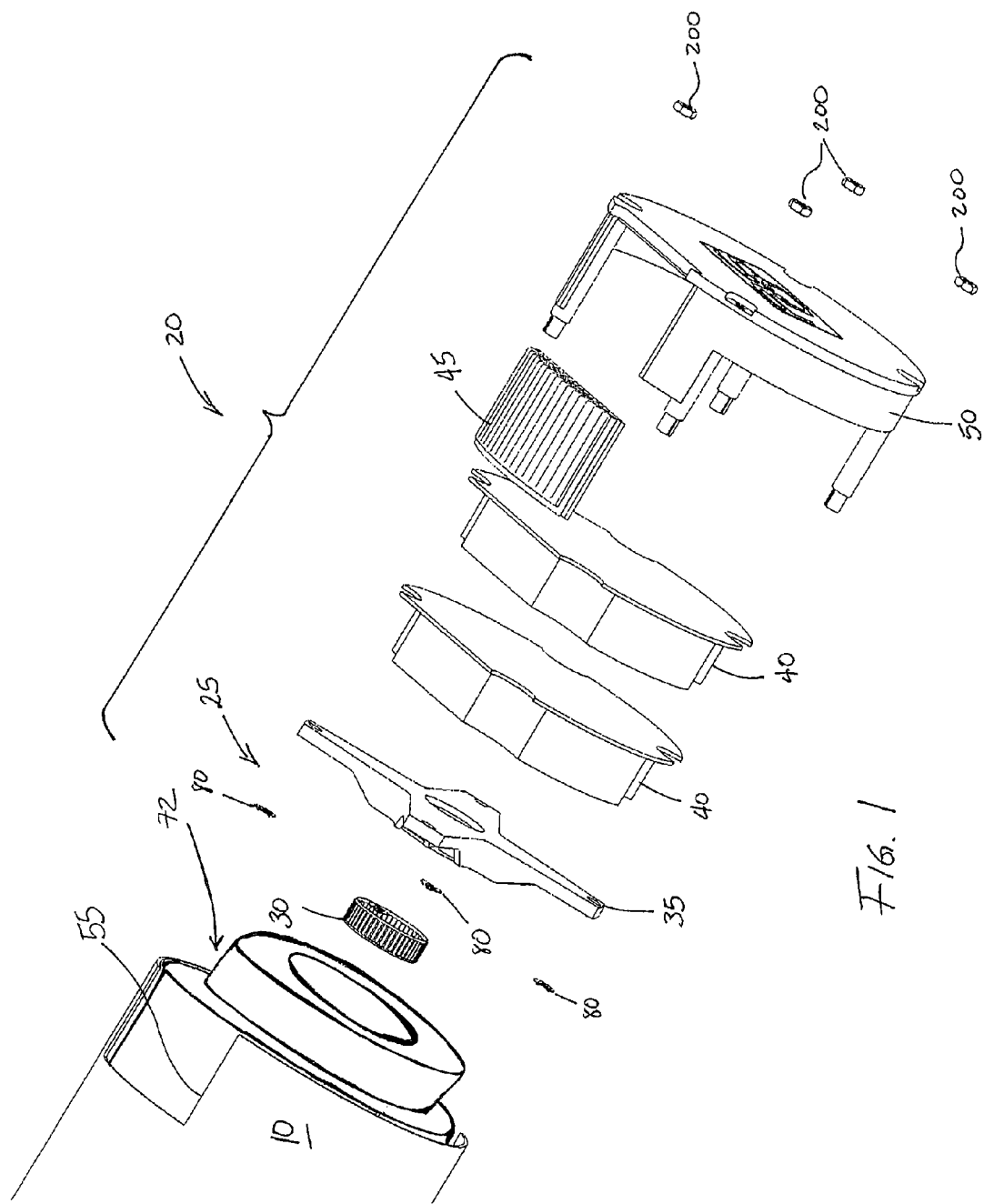
FIG. 1 is a partial exploded view of a motor having a mainframe and an end frame assembly.
Figure 2:
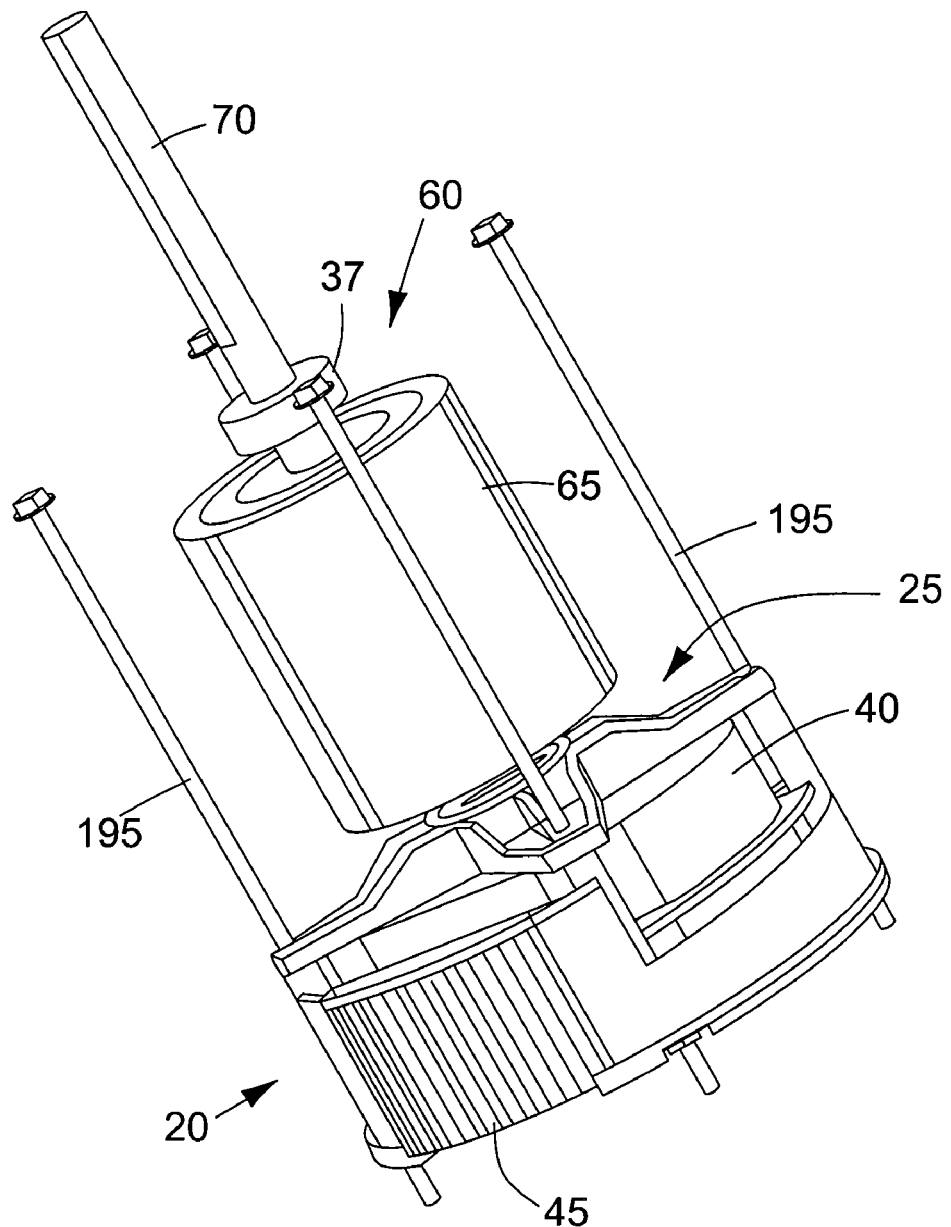
FIG. 2 is a perspective view of the end frame assembly coupled to a rotor assembly.
Figure 6:
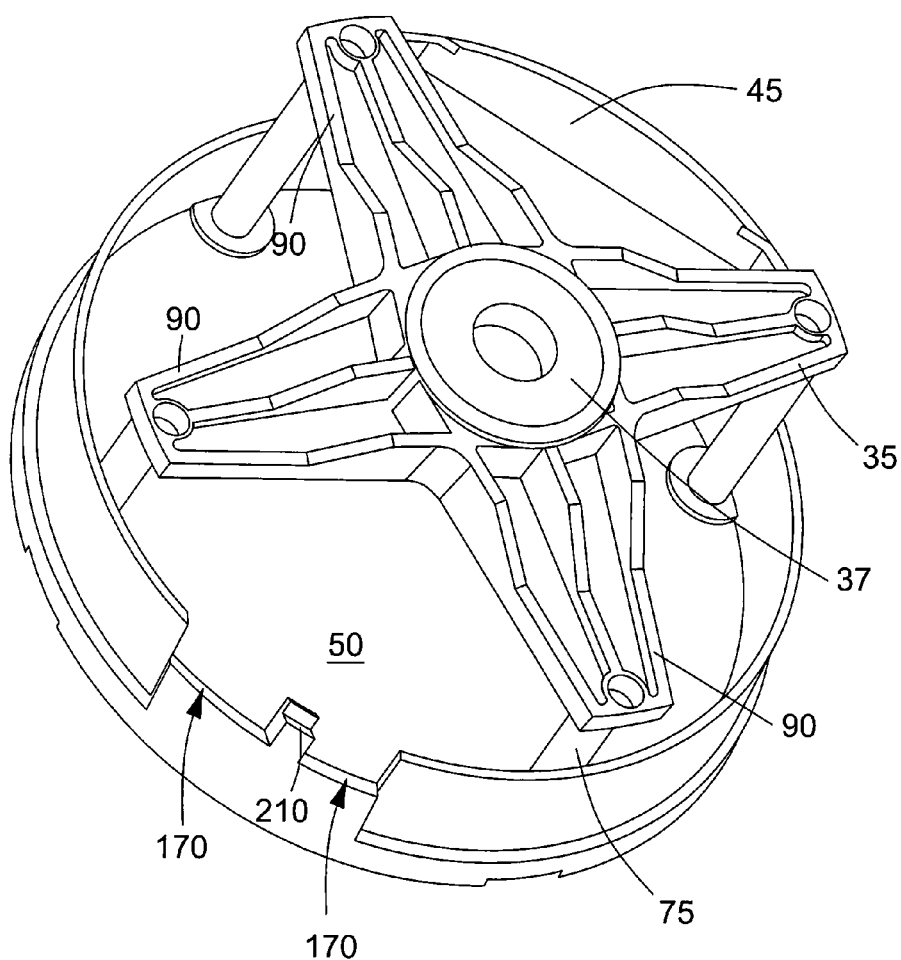
FIG. 6 is a perspective view of an end frame coupled to a bearing support assembly shown in FIG. 1.
Figure 7:
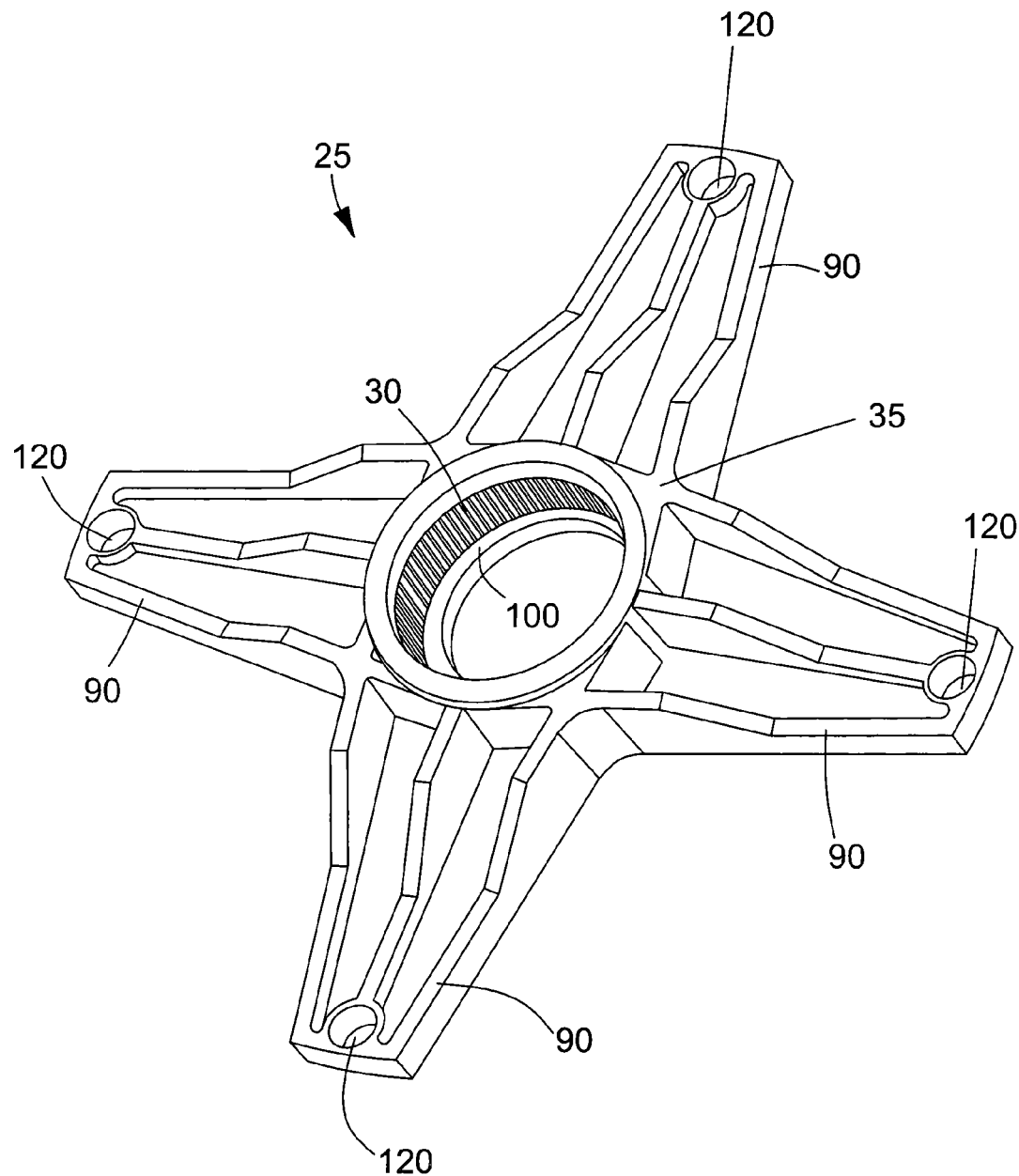
FIG. 7 is a perspective view of the bearing support with a radial retaining ring shown in FIG. 1.
Figure 8:
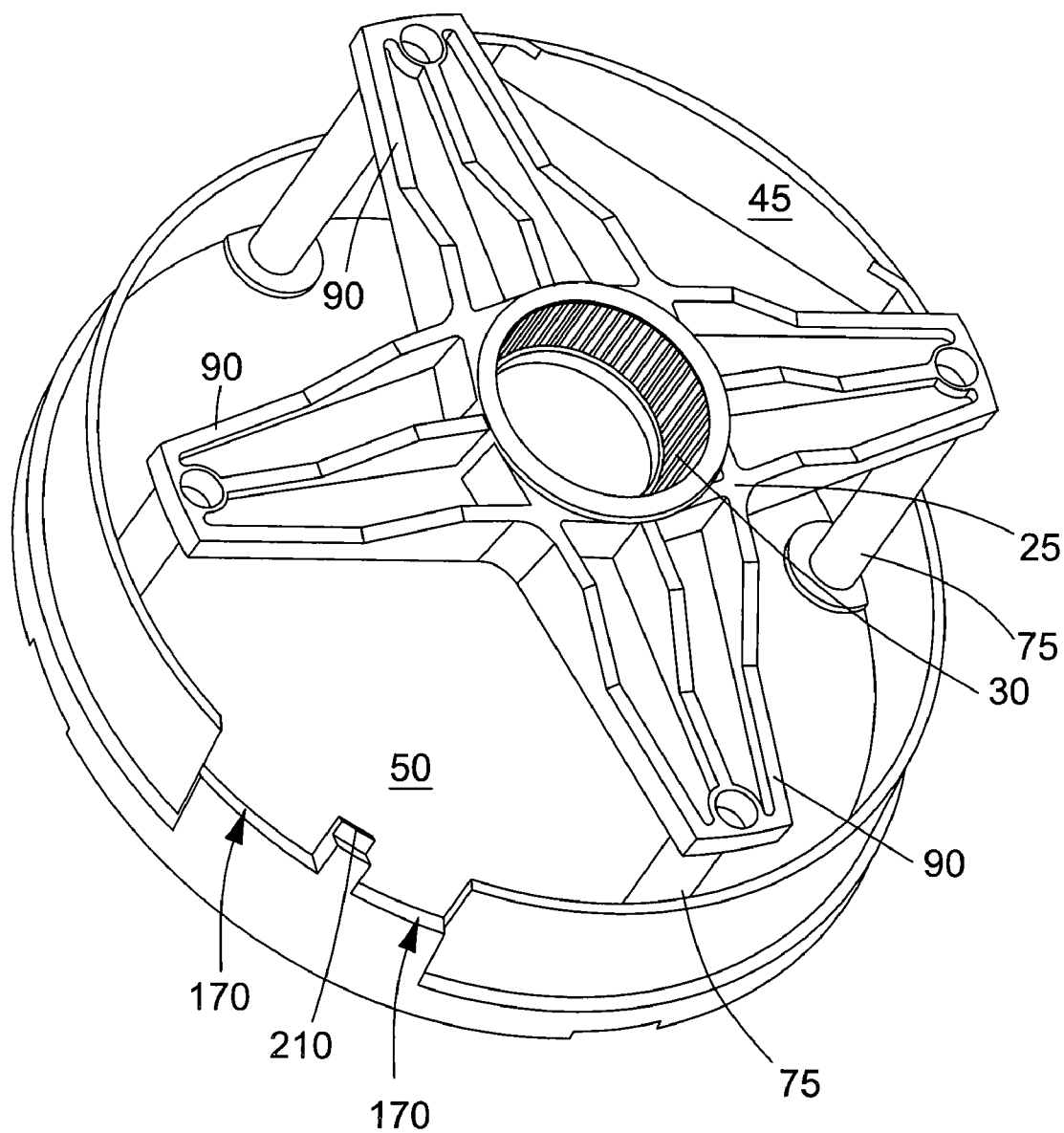
FIG. 8 is a perspective view of the bearing support with the retaining ring coupled to the end frame.
Figure 9:
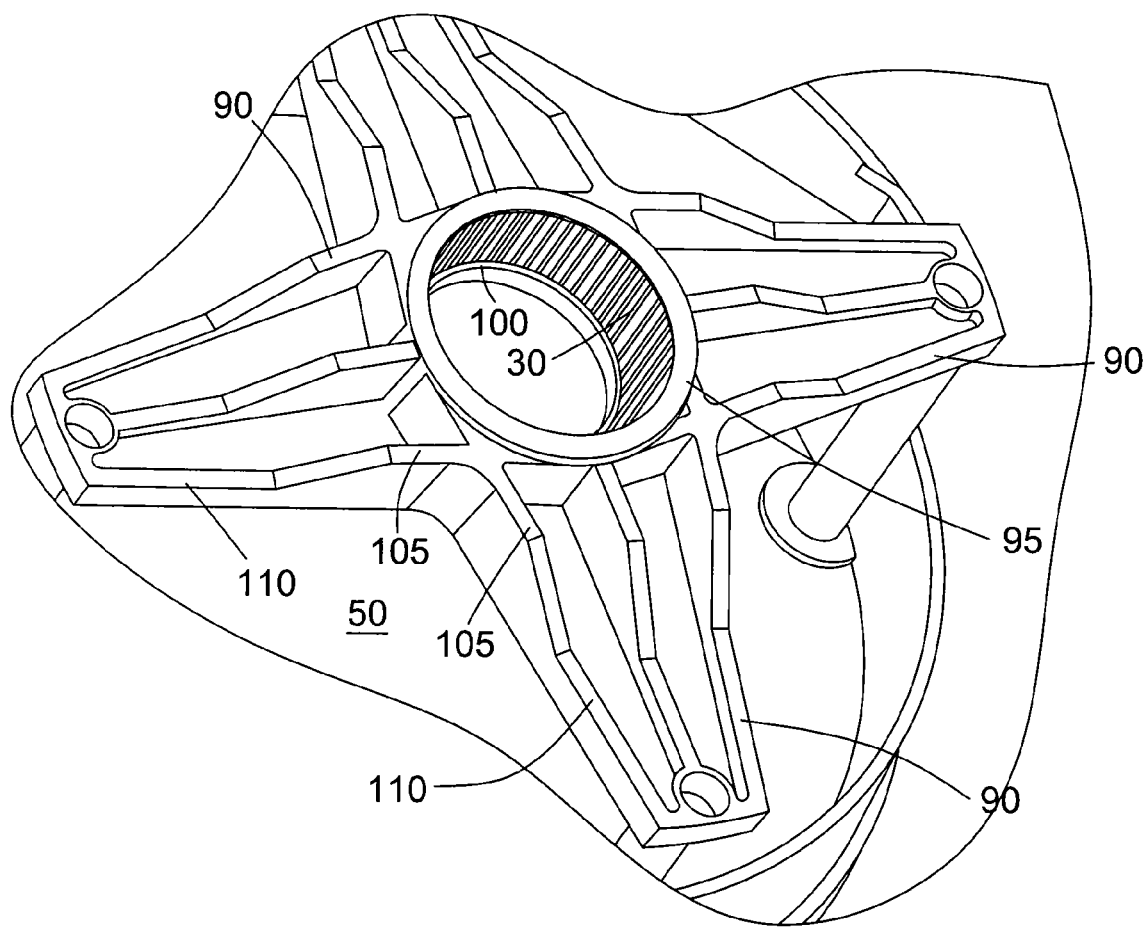
FIG. 9 is a detailed perspective view of the bearing support with the retaining ring coupled to the end frame.
Figure 11:
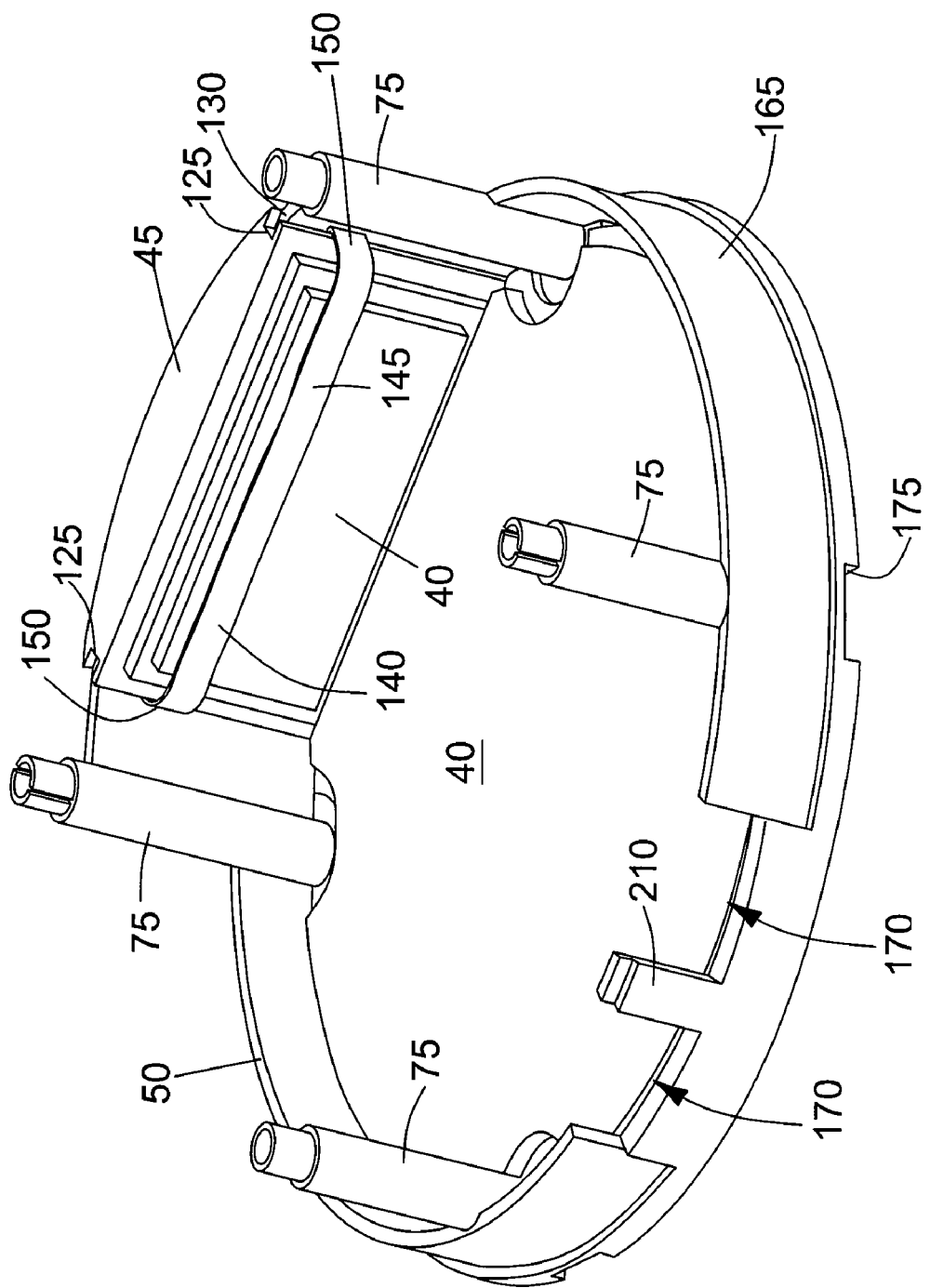
FIG. 11 is a perspective view of the heat sink coupled to the end frame with a heat sink spring.

FIG. 1 partially illustrates an electric motor including a mainframe 10 and an end frame assembly 20. The end frame assembly 20 includes a bearing support assembly 25 having a retaining ring 30, a bearing support 35, and a bearing 37 (shown in FIGS. 3 and 6). The bearing support assembly 25 is housed within the mainframe 10 as part of the end frame assembly 20. The end frame assembly 20 also includes electronics 40, a heat sink 45, and an end frame 50. The electronics 40 control the operation of the electric motor. As shown in FIGS. 2 and 4, the electronics 40 are secured to the end frame 50. As shown in FIG. 11, the electronics 40 can also be coupled directly to the heat sink 45.

The mainframe 10 includes one or more slots 55 to provide necessary edge surfaces to secure the heat sink 45 and electrical connectors, while allowing their exposure to outside air for cooling and customer use. The mainframe 10 also surrounds and covers most of the electric motor 10.

FIG. 2 illustrates the end frame assembly 20 coupled to a rotor assembly 60 including a rotor 65 mounted onto a rotating shaft 70 supported by two bearings 37 (only one shown in FIG. 2). The bearing support assembly 25 is operable to receive the other of the two bearings 37 and is placed between the motor electronics 40 and the rotor assembly 60. A stator 72 (partially shown in FIG. 1) operates with the rotor assembly 60 to generate a torque and is at least partially supported within the mainframe 10.

Figure 3:
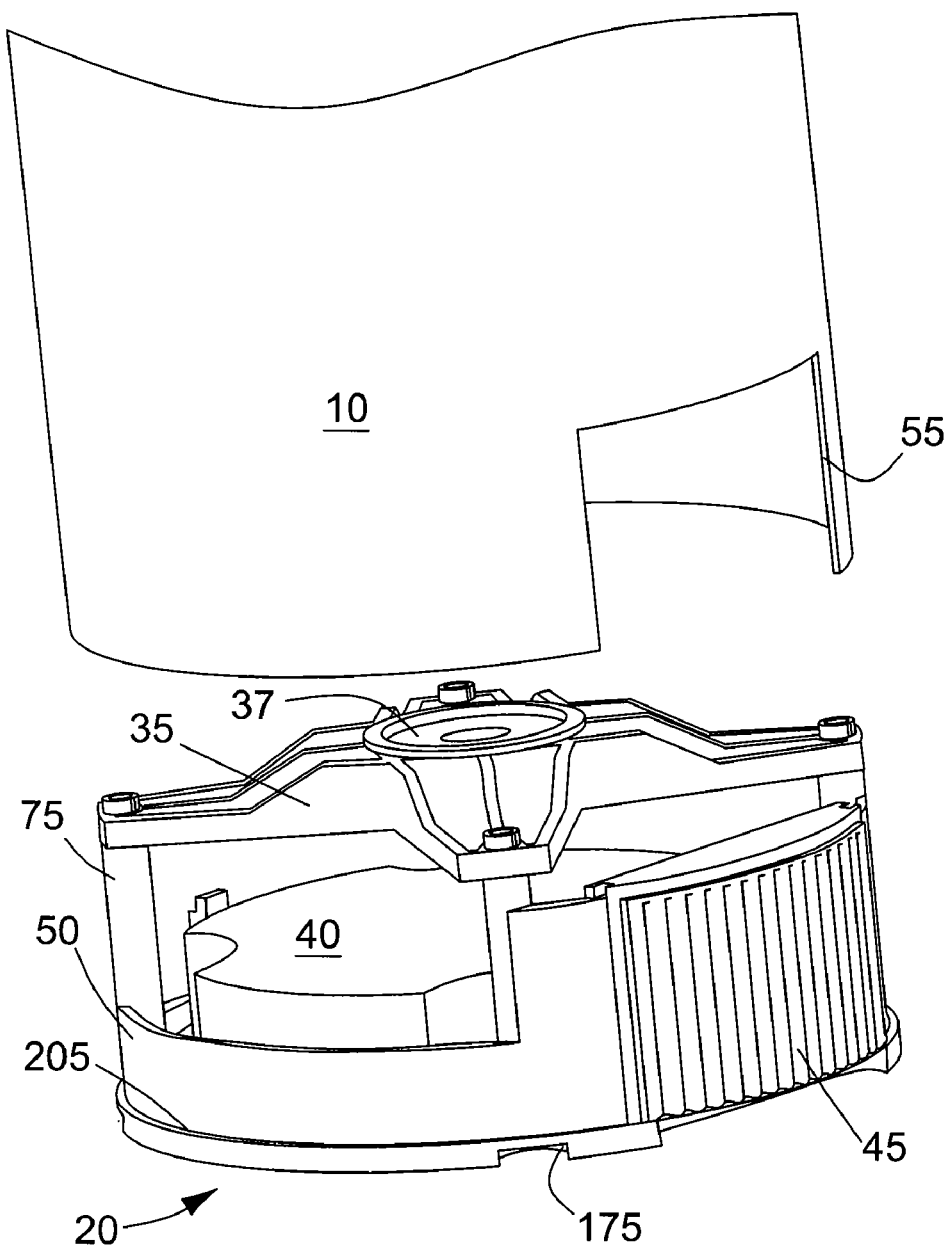
FIG. 3 is perspective view of the end frame assembly aligned with the mainframe.
Figure 4:
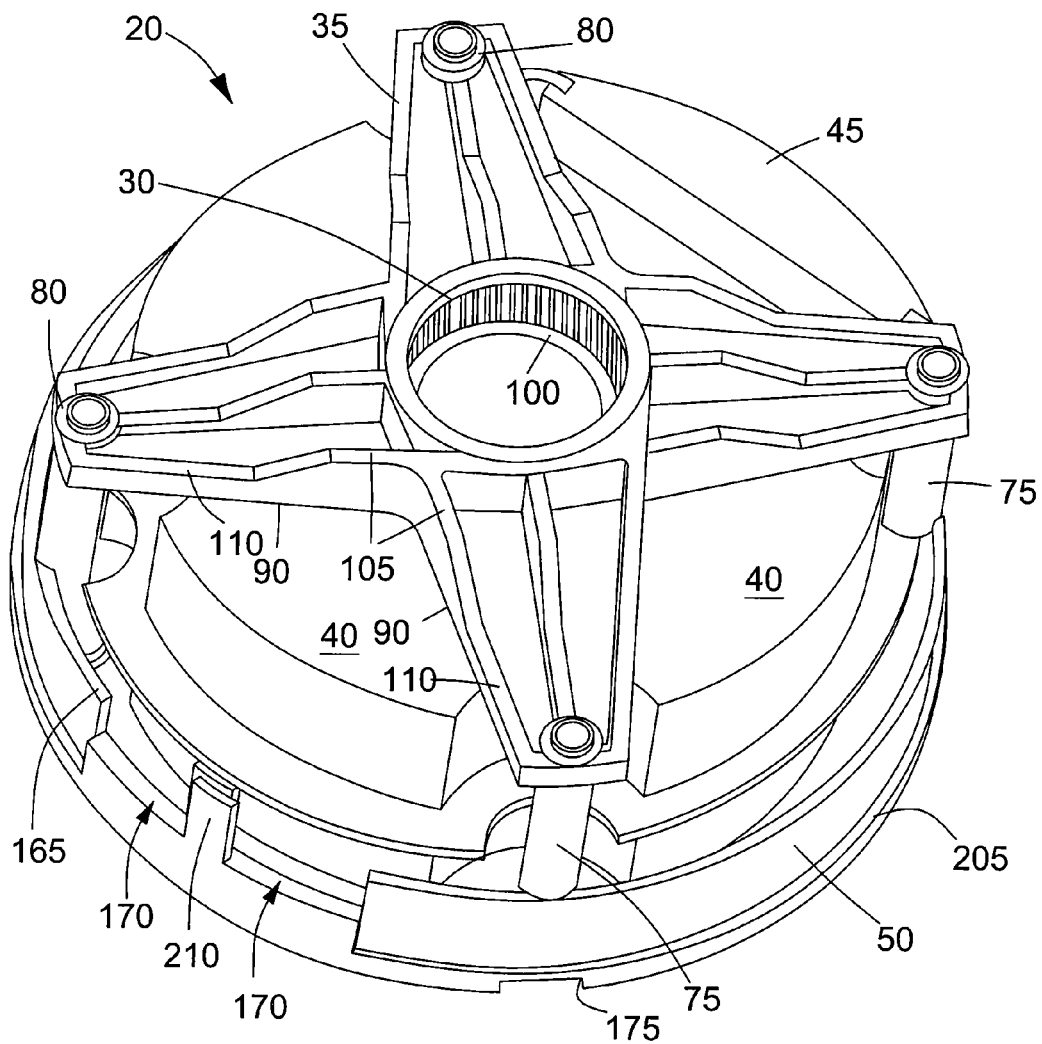
FIG. 4 is a perspective view of the end frame assembly.

FIG. 3 shows the end frame assembly 20 in axial alignment with the mainframe 10. Accordingly, one slot 55 of the mainframe 10 is aligned with the heat sink 45 of the end frame assembly 20. FIG. 4 is a perspective view of the end frame assembly 20 showing the bearing support 35 with the retaining ring 30 positioned within the bearing support 35. The bearing support 35 is coupled to the end frame 50 which supports the electronics 40 between the bearing support 35 and the end frame 50. The end frame 50 includes a set of posts 75 for coupling the bearing support 35 to the end frame 50. More specifically, the bearing support 35 is press-fit to the posts 75 of the end frame 50 as further explained below. In this particular construction, the end frame assembly 20 includes a retaining clip 80 coupled to each post 75 of the end frame 50 to further retain the bearing support 35 in a coupled position with respect to the end frame 50.

Figure 5:
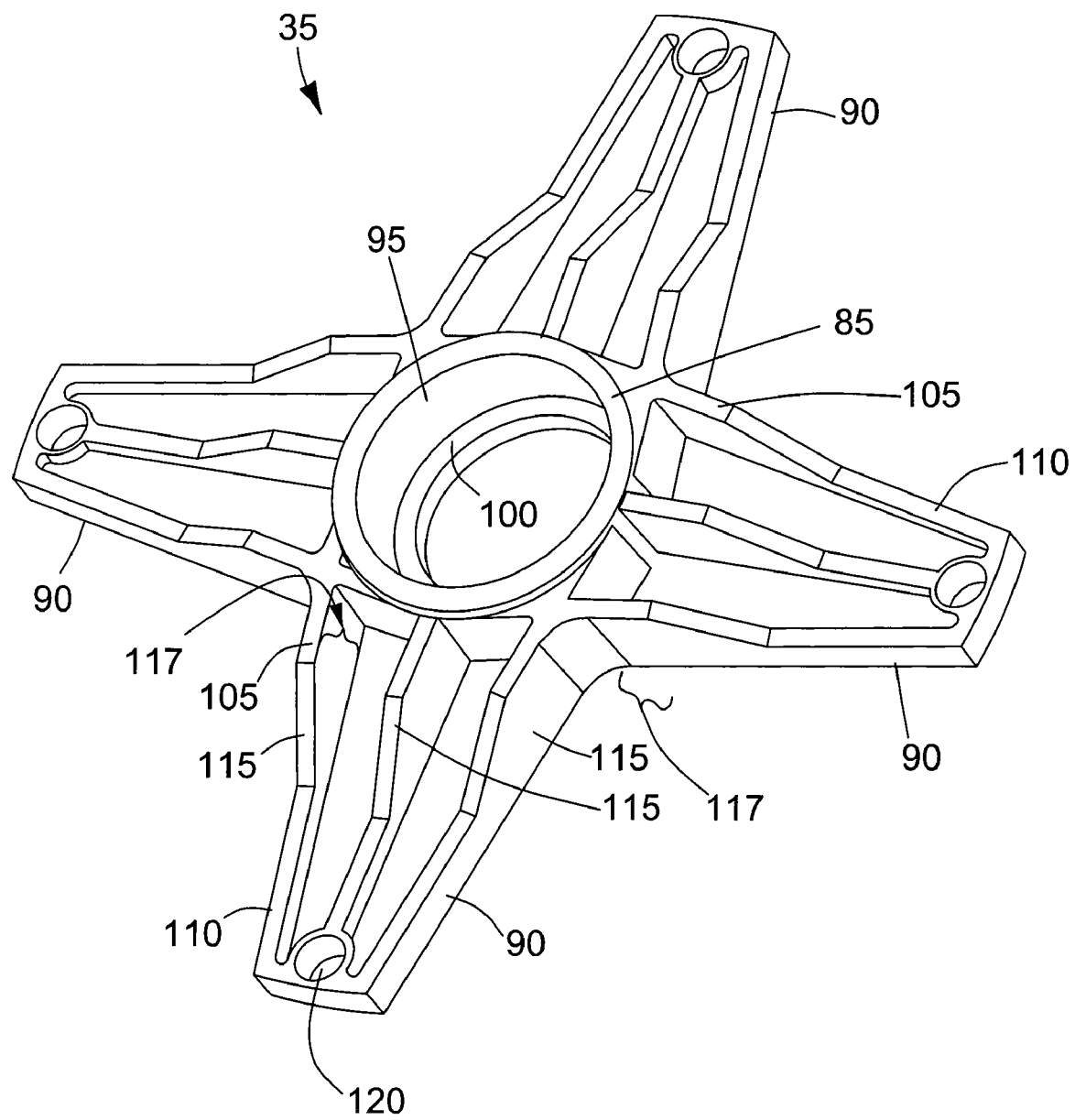
FIG. 5 is a perspective view of a bearing support shown in FIG. 1.

FIG. 5 is a perspective view of the bearing support 35 including a central portion 85 and four arms 90. However, other constructions of the bearing support 35 can include a different number of arms 90 based on load testing and/or design specifications. The bearing support 35 can be manufactured of an injection molded resin material, a cast metal, a composite, or another suitable material. The resin material for manufacturing the bearing support 35 can be either filled or unfilled with additional materials or additives, such as minerals or glass. The central portion 85 of the bearing support 35 includes a circular inner diameter 95 and an end surface 100. The inner diameter 95 can be formed or machined to a size designed to accept a bearing (e.g., ball bearing, roller bearing, needle ball bearing, journal bearing, etc.), such as the ball bearing 37 shown in FIGS. 3 and 6. In some constructions, the manufacturing process (e.g., injection molding process) of the bearing support 35 can include encapsulating the bearing (e.g., ball bearing 37) within the central portion 85. The end surface 100 helps support the bearing 37 within the inner diameter 95 and helps prevent the bearing 37 from sliding and contacting the electronics 40.

In this particular construction, each of the four arms 90 includes an inner portion 105, an outer or peripheral portion 110, and three reinforcement ribs 115 extending from the inner portion 105 to the outer portion 110. Other constructions of the bearing support 35 can include arms 90 having a different number of ribs 115 or no ribs at all. The ribs 115 at the inner portion 105 define an axial height 117 similar to the axial height of the inner diameter 95. The axial height of the ribs 115 decreases in the outer portion 110 of the arms 90. The outer portion 110 of each arm 90 includes a coupling aperture 120. As shown in FIGS. 3, 4, 6, 8, 16, and 17, each of the apertures 120 is configured to receive one post 75 of the end frame 50 for coupling the bearing support 35 to the end frame 50. It is to be understood that the bearing support 35 shown in FIG. 5 is only one construction and other constructions of the bearing support 35 fall within the scope of the invention.

For example, in some constructions the bearing support assembly 25 does not include an encapsulated bearing. Accordingly, the bearing support assembly 25 can alternatively include a steel or porous iron bearing ring of split or unsplit construction, which can be included in an injection molding process. In the cases when a bearing ring is included in the bearing support assembly, a preload spring can also be included. In the cases where no bearing ring is used, the bearing support assembly can include a steel retaining ring. As shown in FIGS. 1 and 7-9, the bearing support assembly 25 includes the radial retaining ring 30, which is designed to act as a radial retaining device and/or to assist with locating the bearing 37 concentrically within the mainframe 10. In the cases when the bearing support assembly 25 includes the retaining ring 30 (as shown in FIGS. 1 and 7-9), the use of a preload spring is generally not necessary in the bearing support assembly 25.

Figure 10:
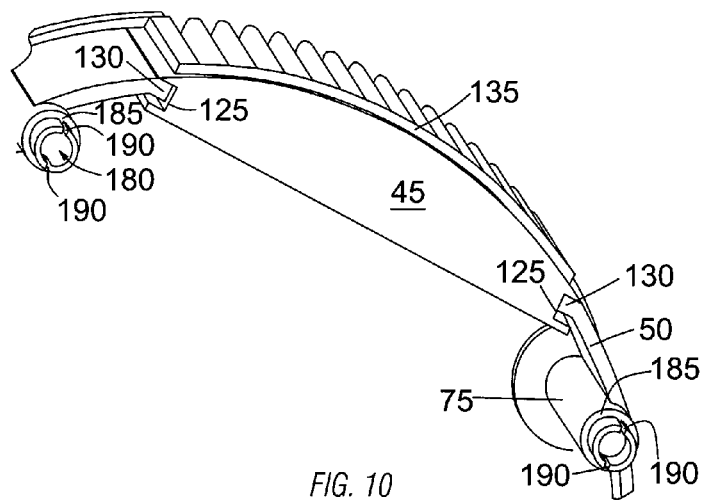
FIG. 10 is a perspective view of a heat sink shown in FIG. 1 mounted on the end frame.

FIG. 10 illustrates one construction of the heat sink 45, also shown in FIGS. 1-3. In the illustrated construction, the heat sink 45 is in heat transfer relationship with the electronics 40. In other words, the heat sink 45 is designed to cool the electronics 40 mounted on the end frame assembly 20. The heat sink 45 can be manufactured of various materials suitable for heat transfer. In some cases, the heat sink 45 is manufactured of extruded or die-cast aluminum. The heat sink 45 includes two mounting grooves 125 located on either side of the heat sink 45 and operable for connecting the heat sink 45 to the end frame 50. More specifically, the end frame 50 includes guide rails 130 that engage the grooves 125 of the heat sink 45. The heat sink 45 also includes a recessed lip 135 defined around the outside perimeter of the heat sink 45 for mating the heat sink 45 to the mainframe 10. In other words, the lip 135 is designed to contact the slot 55 of the mainframe 10 shown in FIGS. 1 and 3. This lip 135 substantially matches the outer diameter of the end frame 50, thus helping to inhibit contaminants from entering the electric motor when the end frame assembly 20 is mounted to the mainframe 10.

In some constructions, the heat sink 45 can also have a secondary groove (not shown) defined around the perimeter of the heat sink 45 to accept edge surfaces of one slot 55 of the mainframe 10. The secondary groove can receive edges of the slot 55 during assembly of the end frame assembly 20 and the mainframe 10 to provide a higher degree of contaminant protection.

Figure 12:
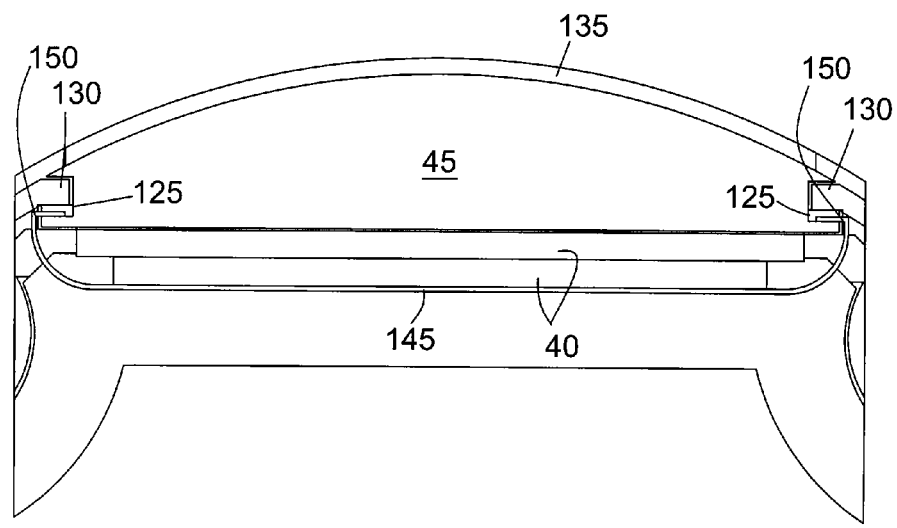
FIG. 12 is an end view of the heat sink and the heat sink spring.
Figure 13:
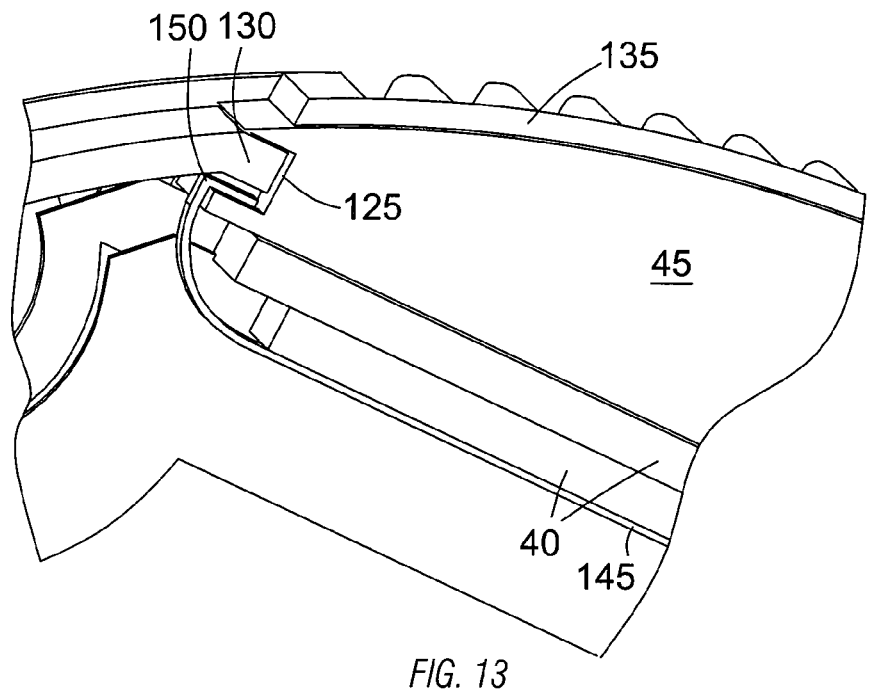
FIG. 13 is an enlarged perspective view of a portion of the heat sink spring.

With reference to FIGS. 11-13, the end frame assembly 20 can include a heat sink spring 140 for maintaining the connection between the heat sink 45, the electronics 40, and the end frame 50. The spring 140 includes a band 145 and clips 150 that define a leaf spring. The band 145 wraps around at least a portion of the electronics 40. In this particular case, the grooves 125 are designed to receive the clips 150 adjacent to the guide rails 130. Other constructions of the end frame 20 can include other mechanisms to connect the electronics 40 to the heat sink 45.

Figure 14:
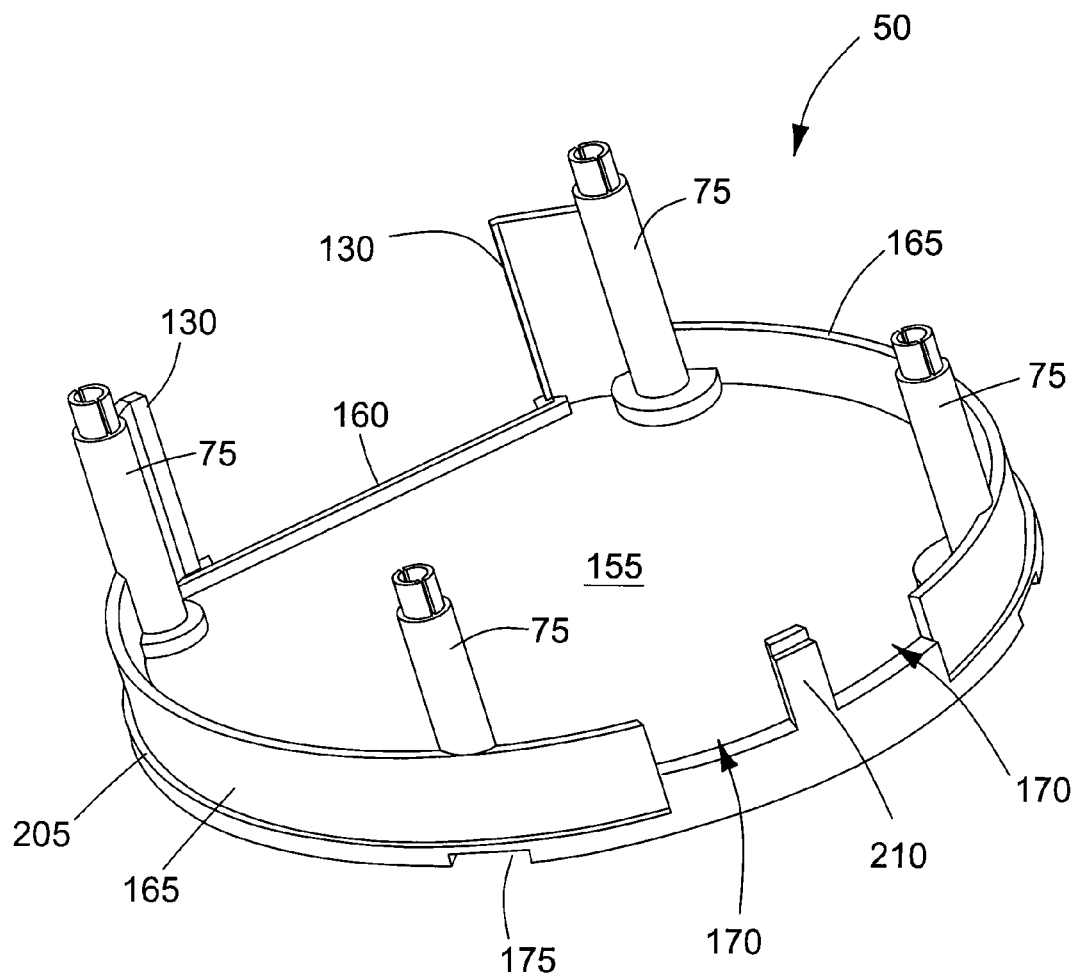
FIG. 14 is a perspective view of the end frame shown in FIG. 1.

FIG. 14 is a perspective view of the end frame 50 according to one embodiment of the invention. The end frame 50 can be manufactured of injection molded resin material, metal, composites, or other suitable materials. In constructions that use resin material, the resin material can either be filled or unfilled with additives, such as minerals or glass, to enhance rigidity, moldability, EMF emissions, UV rating, flame rating, cold impact resistance, and other characteristics of the end frame 50. The end frame 50 includes features to aid in the assembly of the components of the end frame assembly 20. The end frame 50 includes an end plate 155, posts 75, guide rails 130, a lip 160, a tenon 165, connector slots 170, and nut recesses 175 (only one shown in FIG. 14). The lip 160 of the end frame 50 helps provide a positive stop for the heat sink 45 during assembly of the heat sink 45 to the end frame 50.

Figure 15:
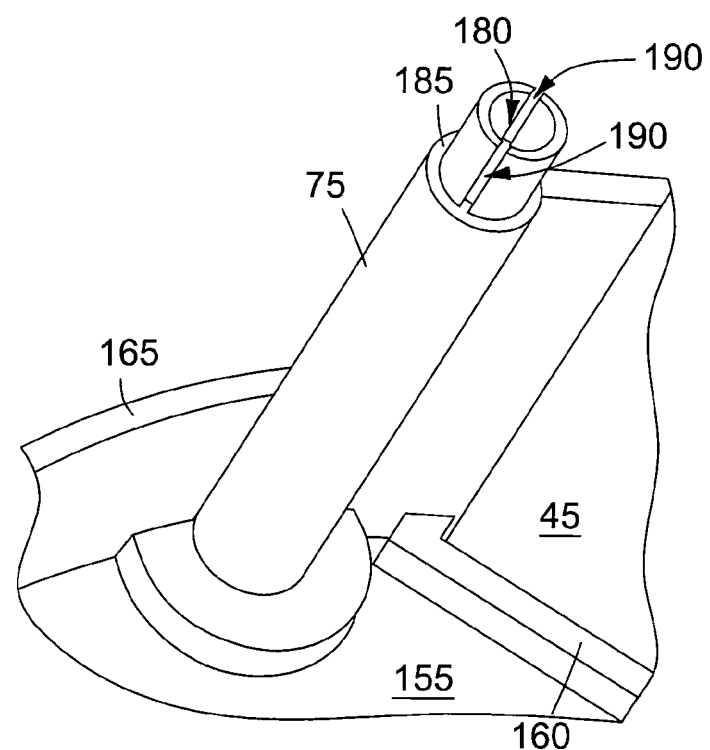
FIG. 15 is a perspective view of a post of the end frame.
Figure 16:
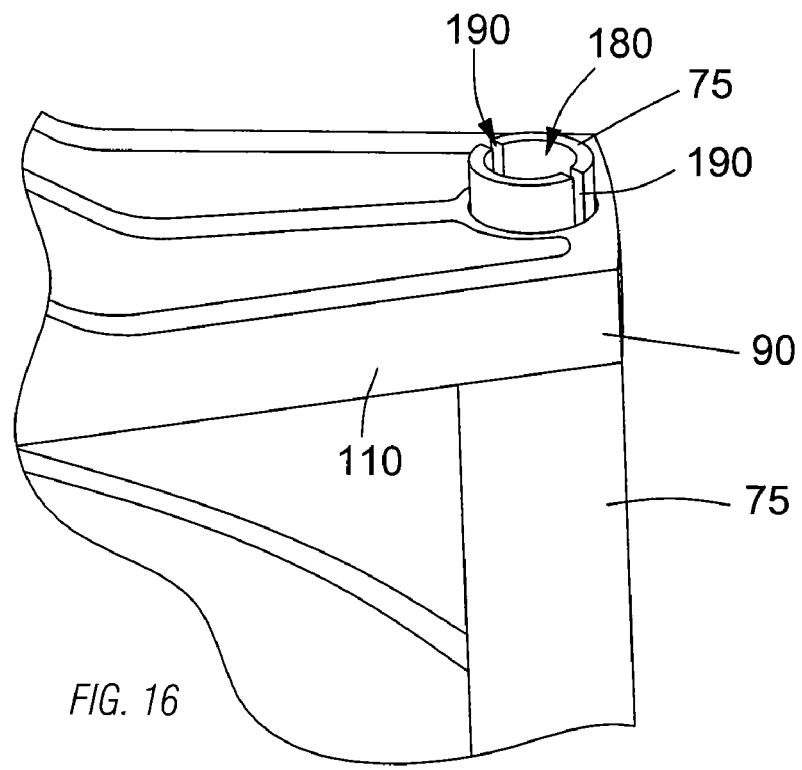
FIG. 16 is a detailed view of a bearing support arm coupled to the post.
Figure 17:
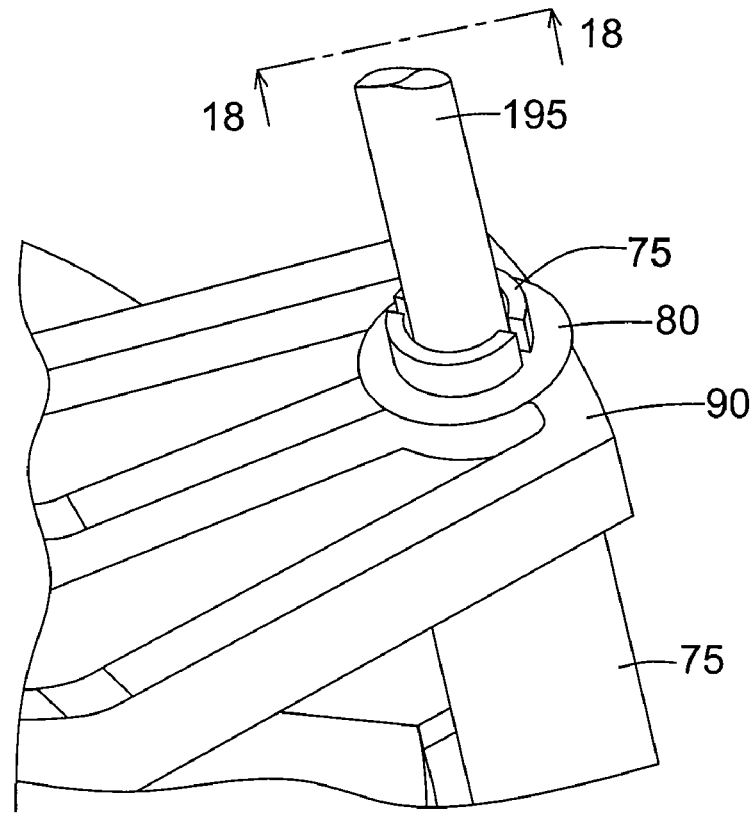
FIG. 17 is another detailed view of the bearing support arm coupled to the post using a clip shown in FIG. 1.
Figure 18:
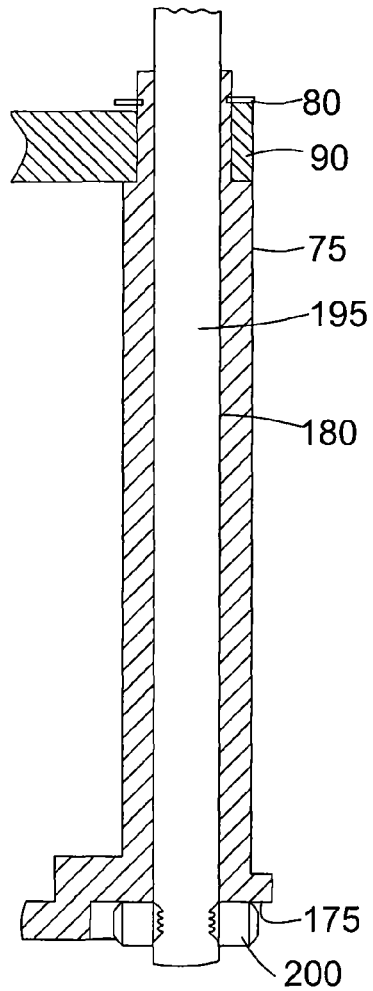
FIG. 18 is a section view of a through-bolt and the post of the end frame taken along line 18-18 of FIG. 17.
Figure 19:
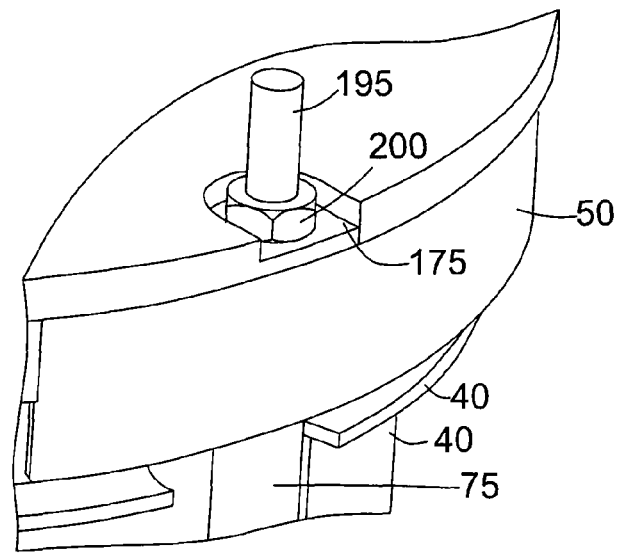
FIG. 19 is a perspective view of the post and through-bolt.

With reference to FIGS. 15 and 16, the posts 75 of the end frame 50 include a through passage 180 and a locating shoulder 185. In this particular construction, the bearing support assembly 25 is mounted to the end frame 50 by press-fitting the bearing support 35 to the posts 75. More specifically, bearing support 35 is press-fitted to the end frame 50 such that the apertures 120 of the bearing support 35 receive corresponding posts 75. For that purpose, locating shoulders 185 act as the mounting surface for the bearing support assembly 25 to prevent the bearing support 35 from interfering with the electronics 40 mounted between the bearing support assembly 25 and the end frame 50. Additionally, each post 75 includes stress relief slots 190 adjacent to the locating shoulder 185 that are designed to relieve stress as the bearing support assembly 25 is press-fit to the end frame 50.

With reference to FIGS. 2 and 17-20, the through passages 180 of each post 75 support a bolt 195 for securing the end frame assembly 20 to the electric motor. The end frame assembly 20 can also include nuts 200 cooperating with the bolts 195 and located at the nut recesses 175 for securing end frame assembly 20 to the motor. The clips 80 (also shown in FIG. 4) provide additional support to the posts 75 once the bearing support assembly 25 has been press-fitted to the end frame 50. The use of clips 80 is not necessary and is based on the particular application of the motor.

Figure 20:
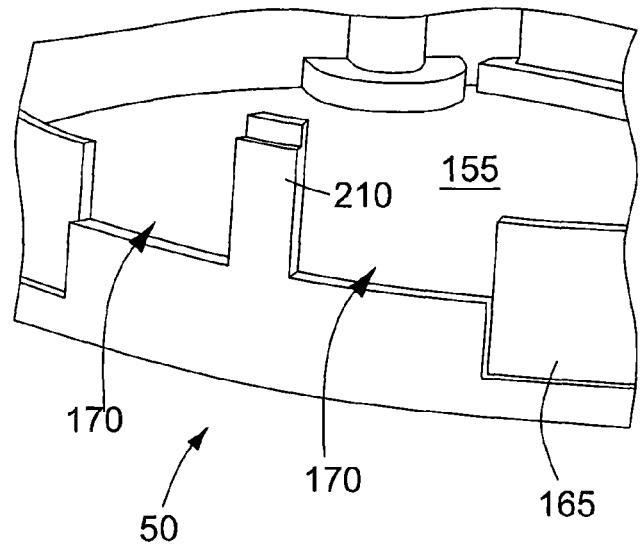
FIG. 20 is a detailed perspective view of a portion of the end frame.

With reference to FIGS. 3 and 14, the tenon 165 is used to locate the end frame assembly 20 within the mainframe 10. The tenon 165 has a sufficient height to provide an adequate containment area for potting the electronics 40. Additionally, the tenon 165 and the outer diameter of the end frame 50 form a shoulder 205 to receive the edge surfaces of the mainframe 10. With reference to FIGS. 14 and 20, the slots 170 in the tenon 165 provide connector access for the electronics 40. The walls of the connector slots 170 are thicker than the tenon 165 to align with the outer diameter of the mainframe 10. The connector slots 170 define a lip 210 therebetween and, in cooperation with the walls of the slots 170, inhibit contaminants from entering the motor. Alternatively, the end frame 50 can include a circular groove (not shown) concentric to the outer diameter of the end frame 50 to capture the mainframe and inhibit the ingress of water in outdoor or washdown applications.

What is claimed is:

1. An electric motor comprising:
   a stator;
   a rotor positioned adjacent the stator and cooperating with the stator to generate a torque;
   a bearing support assembly coupled to the rotor to at least partially support the rotor for rotation;
   an end frame including a post having a locating shoulder, the post positioned such that the locating shoulder engages and supports the bearing support assembly such that the bearing support assembly remains spaced apart from the end frame, the end frame and the bearing support assembly cooperating to define a space therebetween;
   a mainframe coupled to and cooperating with the end frame to substantially enclose the stator; and
   a set of electronics for controlling the motor, the set of electronics mounted in the space.

2. The electric motor of claim 1, wherein the bearing support assembly includes an aperture sized to receive the post and define a press-fit therebetween.

3. The electric motor of claim 1, wherein the post is one of a plurality of posts, and wherein the bearing support assembly includes a plurality of apertures each sized to receive one of the plurality of posts and define a press-fit therebetween.

4. An electric motor comprising:
   a stator;
   a rotor positioned adjacent the stator and cooperating with the stator to generate a torque;
   a bearing support assembly coupled to the rotor to at least partially support the rotor for rotation;
   an end frame including a post positioned to engage and support the bearing support assembly, the end frame and the bearing support assembly cooperating to define a space therebetween, wherein the post is one of a plurality of posts, and wherein the bearing support assembly includes a plurality of apertures each sized to receive one of the plurality of posts and define a press-fit therebetween;
   a mainframe coupled to and cooperating with the end frame to substantially enclose the stator;
   a set of electronics for controlling the motor, the set of electronics mounted in the space; and
   a plurality of fasteners that each pass through one of the plurality of posts to connect the end frame to the mainframe.

5. The electric motor of claim 3, wherein the bearing support assembly includes a plurality of radially-extending arms, each arm including one of the plurality of apertures.

6. The electric motor of claim 5, wherein each of the radially-extending arms includes a rib.

7. The electric motor of claim 1, wherein the bearing support assembly includes a central aperture and a bearing positioned within the central aperture.

8. The electric motor of claim 7, further comprising a bearing ring molded into the bearing support assembly and sized to receive the bearing.

9. The electric motor of claim 7, wherein the bearing support assembly is molded around a portion of the bearing to at least partially encase the bearing and inhibit removal of the bearing.

10. The electric motor of claim 1, further comprising a heat sink coupled to the end frame and in thermal contact with the set of electronics to provide cooling to the set of electronics.

11. The electric motor of claim 10, wherein one of the heat sink and the end frame includes a rail and the other of the heat sink and the end frame includes a groove for receiving the rail.

12. The electric motor of claim 10, further comprising a spring positioned to bias the heat sink into contact with the end frame.

13. An electric motor comprising:
    a stator;
    a rotor assembly with a rotor and a bearing mounted onto a shaft for rotation with respect to the stator;
    a bearing support assembly operable to receive the bearing;
    an end frame coupled to the bearing support assembly to define a space therebetween;
    a set of electronics for controlling the motor, the set of electronics mounted substantially within the space;
    a heat sink coupled to the end frame such that a first surface is exposed to the atmosphere outside of the space and a second surface is in thermal contact with the set of electronics; and
    a spring positioned to bias the heat sink into contact with the end frame.

14. An electric motor comprising:
    a stator;
    a rotor assembly with a rotor and a bearing mounted onto a shaft for rotation with respect to the stator;
    a bearing support assembly operable to receive the bearing;
    an end frame coupled to the bearing support assembly to define a space therebetween;
    a set of electronics for controlling the motor, the set of electronics mounted substantially within the space;
    a heat sink coupled to the end frame such that a first surface is exposed to the atmosphere outside of the space and a second surface is in thermal contact with the set of electronics, wherein one of the heat sink and the end frame includes a rail and the other of the heat sink and the end frame includes a groove for receiving the rail.

15. The electric motor of claim 13, further comprising a bearing ring molded into the bearing support assembly and sized to receive the bearing.

16. The electric motor of claim 13, wherein the bearing support assembly is molded around a portion of the bearing to at least partially encase the bearing and inhibit removal of the bearing.

17. The electric motor of claim 13, wherein the bearing support assembly includes a central portion operable to receive the bearing, and an arm radially extending from the central portion, the arm having a rib extending along at least a portion of the arm, and a receiving aperture adjacent to one end of the arm opposite to the central portion.

18. An electric motor comprising:
a stator;
a rotor assembly with a rotor and a bearing mounted onto a shaft for rotation with respect to the stator;
a bearing support assembly operable to receive the bearing;
an end frame coupled to the bearing support assembly to define a space therebetween;
a set of electronics for controlling the motor, the set of electronics mounted substantially within the space;
a heat sink coupled to the end frame such that a first surface is exposed to the atmosphere outside of the space and a second surface is in thermal contact with the set of electronics, wherein the bearing support assembly includes a central portion operable to receive the bearing, and an arm radially extending from the central portion, the arm having a rib extending along at least a portion of the arm, and a receiving aperture adjacent to one end of the arm opposite to the central portion, and wherein the end frame includes a post with a post aperture therethrough, the receiving aperture of the arm receiving the post to press-fit the bearing support assembly to the end frame, and a fastener that passes through the post aperture to couple the end frame assembly to the stator.

19. The electric motor of claim 18, wherein the post is one of a plurality of posts, and wherein the arm is one of a plurality of arms, each arm including a receiving aperture sized to receive one of the posts to define a press-fit therebetween.

* * * * *